US010528852B2

(12) United States Patent
Tonouchi et al.

(10) Patent No.: US 10,528,852 B2
(45) Date of Patent: Jan. 7, 2020

(54) INFORMATION PROCESSING APPARATUS, METHOD AND COMPUTER PROGRAM PRODUCT

(71) Applicant: KABUSHIKI KAISHA TOSHIBA, Tokyo (JP)

(72) Inventors: Yojiro Tonouchi, Tokyo (JP); Kazushige Ouchi, Saitama (JP); Hideo Umeki, Kanagawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 229 days.

(21) Appl. No.: 15/694,594

(22) Filed: Sep. 1, 2017

(65) Prior Publication Data

US 2018/0276506 A1    Sep. 27, 2018

(30) Foreign Application Priority Data

Mar. 22, 2017  (JP) .................................. 2017-055368

(51) Int. Cl.
*G06K 9/72* (2006.01)
*G06F 3/14* (2006.01)

(52) U.S. Cl.
CPC ................. *G06K 9/72* (2013.01); *G06F 3/14* (2013.01)

(58) Field of Classification Search
CPC ........ G06F 3/14; G06K 9/72; G06K 2209/01; G06K 9/00818; G06K 9/22; G06K 9/00449
See application file for complete search history.

(56) References Cited

U.S. PATENT DOCUMENTS

| 8,761,513 | B1 | 6/2014 | Rogowski et al. |
| 2002/0181775 | A1* | 12/2002 | Matsugu ............ G06K 9/00281 382/195 |
| 2003/0044068 | A1 | 3/2003 | Kagehiro et al. |
| 2007/0110319 | A1* | 5/2007 | Wyatt ...................... G06K 9/40 382/199 |
| 2009/0303508 | A1 | 12/2009 | Tanaka et al. |
| 2011/0090253 | A1 | 4/2011 | Good |
| 2013/0039537 | A1 | 2/2013 | Yamazaki et al. |
| 2013/0216094 | A1* | 8/2013 | DeLean ............ G06K 9/00335 382/103 |

(Continued)

FOREIGN PATENT DOCUMENTS

| JP | 1-241684 A | 9/1989 |
| JP | 5-282091 A | 10/1993 |

(Continued)

OTHER PUBLICATIONS

Barak Turovsky, "Hallo, hola, olá to the new, more powerful Google Translate app", Jan. 14, 2015, 5 pages, https://www.blog.google/products/translate/hallo-hola-ola-more-powerful-translate/.

*Primary Examiner* — Yon J Couso
(74) *Attorney, Agent, or Firm* — Oblon, McClelland, Maier & Neustadt, L.L.P.

(57) ABSTRACT

According to one embodiment, an information processing device includes a memory and a processor. The processor is configured to acquire an image, determine a likelihood of presence of an objected within the image, display information on a position of the object within the image based on the likelihood, identify the object within the image, and generate a recognition result based on the identified object.

18 Claims, 14 Drawing Sheets

(56) References Cited

U.S. PATENT DOCUMENTS

| | | |
|---|---|---|
| 2014/0297256 A1 | 10/2014 | Rogowski et al. |
| 2015/0116349 A1 | 4/2015 | Hamada et al. |
| 2016/0004692 A1 | 1/2016 | Rogowski et al. |
| 2016/0026899 A1 | 1/2016 | Wang et al. |
| 2016/0063340 A1 | 3/2016 | Suzuki et al. |
| 2016/0275375 A1* | 9/2016 | Kant .................. G06K 9/4604 |
| 2018/0225536 A1 | 8/2018 | Tonouchi |

FOREIGN PATENT DOCUMENTS

| | | | |
|---|---|---|---|
| JP | 2000-23012 A | 1/2000 |
| JP | 2000-207487 A | 7/2000 |
| JP | 2001-357355 A | 12/2001 |
| JP | 2003-78640 A | 3/2003 |
| JP | 2004-341977 A | 12/2004 |
| JP | 2005-18507 A | 1/2005 |
| JP | 2005-55969 A | 3/2005 |
| JP | 2005-135210 A | 5/2005 |
| JP | 2007-266873 A | 10/2007 |
| JP | 2009-296533 A | 12/2009 |
| JP | 2012-222581 A | 11/2012 |
| JP | 2013-122747 A | 6/2013 |
| JP | 2015-88046 A | 5/2015 |
| JP | 2016-45877 A | 4/2016 |
| JP | 2016-76093 A | 5/2016 |
| JP | 2016-519797 A | 7/2016 |
| JP | 2018/124918 A | 8/2018 |

\* cited by examiner

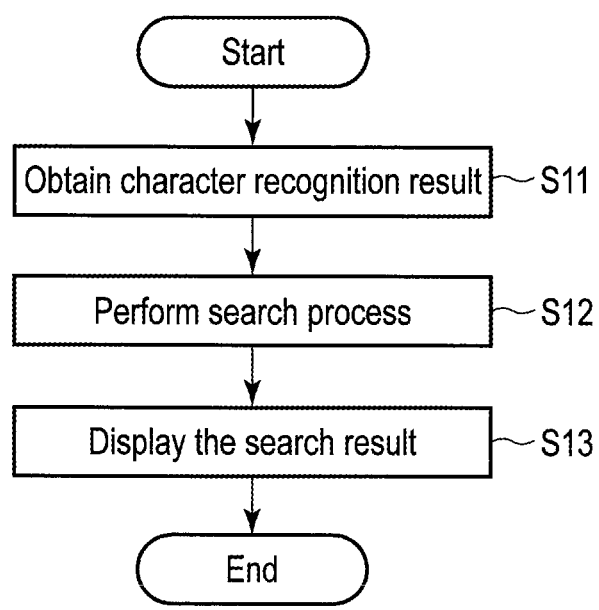
F I G. 12

INFORMATION PROCESSING APPARATUS, METHOD AND COMPUTER PROGRAM PRODUCT

CROSS-REFERENCE TO RELATED APPLICATIONS

This application is based upon and claims the benefit of priority from Japanese Patent Application No. 2017-055368, filed Mar. 22, 2017, the entire contents of which are incorporated herein by reference.

FIELD

Embodiments described herein relate generally to the field of information processing, and more particularly to an information processing apparatus and a method capable of image processing and character recognition.

BACKGROUND

Recently, an information processing apparatus that is able to recognize a specific recognition target from an image has been developed. As one example of the information processing apparatus, there is a character recognition apparatus that recognizes characters from an image by taking the image of an object on which the characters are written.

Here, the character recognition apparatus needs a certain amount of processing time in order to recognize the characters from the image.

However, for example, a display of the character recognition apparatus displays only the taken image during the character recognition process is being executed. Users of the character recognition apparatus cannot recognize whether the character recognition process is properly executed or not in the character recognition apparatus.

Moreover, when a plurality of character recognition results are displayed on the display, visibility of the results for users might be degraded. This kind of character recognition apparatus is hard for users to use and is inconvenient. Therefore, for image recognition of recognition targets such as characters, development of a display that is able to enhance user convenience has been required.

BRIEF DESCRIPTION OF THE DRAWINGS

FIG. 12 illustrates one example of flow chart that shows process of character recognition apparatus when the character recognition result is utilized for search process according to an aspect of the present disclosure.

The specific aspects of the present disclosure, which have been illustrated by the accompanying drawings described above, will be described in detail below. These accompanying drawings and description are not intended to limit the scope of the present disclosure in any manner, but to explain the concept of the present disclosure to those skilled in the art via referencing specific aspects.

DETAILED DESCRIPTION

In general, according to one embodiment, an information processing device includes a memory and a processor. The processor is configured to acquire an image, determine a likelihood of presence of an objected within the image, display information on a position of the object within the image based on the likelihood, identify the object within the image, and generate a recognition result based on the identified object.

Hereinafter, reference will now be made in detail to exemplary aspects of the disclosure are described with reference to the drawings. The implementations set forth in the following description of illustrative aspects do not represent all implementations consistent with the disclosure. Instead, they are merely examples of apparatuses and methods consistent with aspects related to the disclosure as recited in the appended claims.

Figure 1:
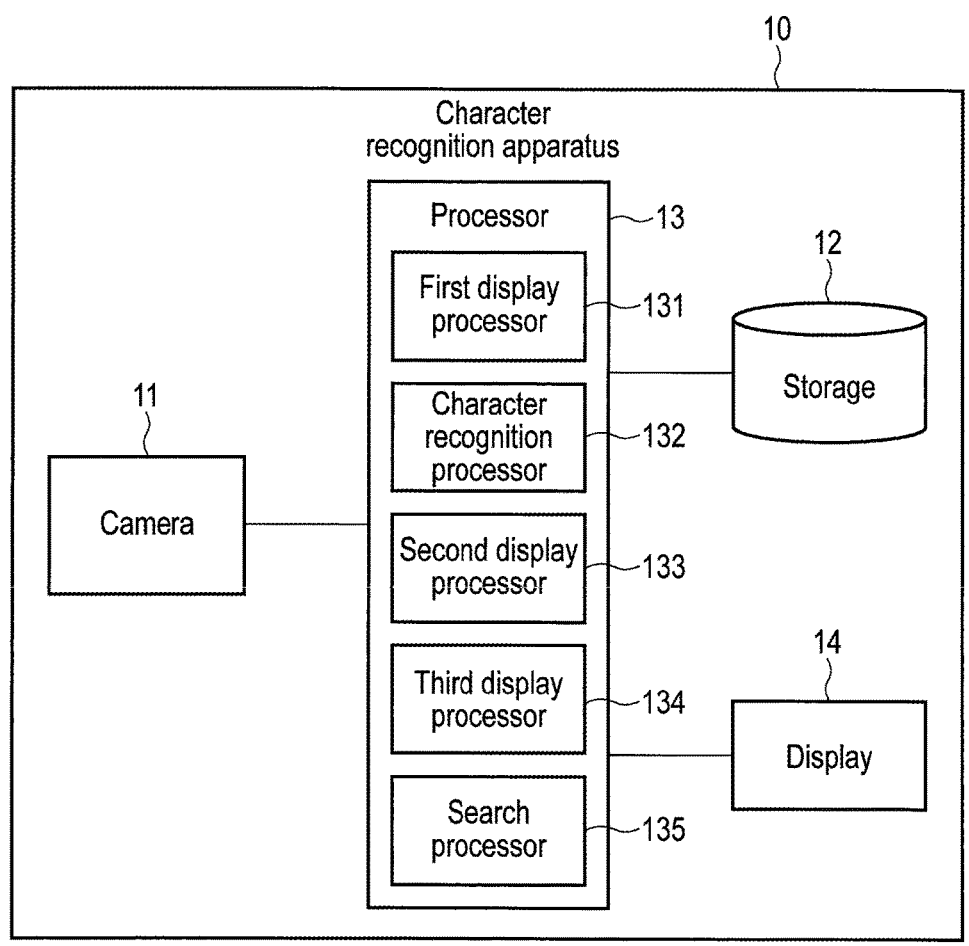
FIG. 1 illustrates a block diagram that shows a configuration example of information processing apparatus according to an aspect of the present disclosure.

FIG. 1 illustrates a block diagram that shows a configuration example of information processing apparatus according to the present aspect. The information processing apparatus according to the present aspect has a function to recognize a recognition target from an image. The information processing apparatus may be a field-portable electronic device such as smartphone and tablet computer. In the following description, the information processing apparatus that recognizes characters as recognition target (hereinafter, character recognition apparatus) is mainly explained.

As illustrated in FIG. 1, a character recognition apparatus 10 includes a camera 11, storage 12, a processor 13 and a display 14.

The camera 11 may be embedded on the back of the character recognition apparatus 10 such as smartphone. The camera 11 takes an image of an object positioned around a user who holds the character recognition apparatus 10. Here, the object includes such as advertising displays on which characters (or character strings) are written. In the present aspect, the camera 11 takes an image including a plurality of characters.

The storage 12 is implemented by a storage device (e.g., non-transitory computer-readable medium) included in the character recognition apparatus 10 such as HDD (Hard Disk Drive), SSD (Slid State Drive), ROM (Read Only Memory) and RAM (Random Access Memory). For example, the storage 12 can store the images taken by the camera 12.

The processor 13 is implemented by a computer (for example, processing circuitry) included in the character recognition apparatus 10 that executes a program stored in a storage device. Here, the program executed by the computer includes operating system, application program in order to recognize a character from an image (hereinafter, character recognition application) and so on.

The processor 13 includes a first display processor 131, a character recognition processor 132, a second display processor 133, a third display processor 134 and a search processor 135. All or a part of processors 131 to 135 included in the processor 13 are realized by, for example, execution of the character recognition application by the computer. That is, all or a part of processors 131 to 135 are realized by software. Here, all or a part of processors 131 to 135 may be realized by a hardware such as IC (Integrated Circuit) or a combination of software and hardware. The character recognition application executed by the computer may be stored in a computer readable storage or may be downloaded by the character recognition apparatus 10 via network.

The first display processor 131 acquires the image taken by the camera 11. Here, the first display processor 131 may acquire the image stored in the storage 12, for example. Alternatively, the first display processor 131 may acquire the image from a server outside the character recognition apparatus. The first display processor 131 displays the acquired image on the display 14.

The character recognition processor 132 executes a process for character recognition (hereinafter, character recognition process) from the image displayed by the first display processor 131 (the image taken by the camera 11).

The second display processor 133 displays information that shows the character recognition process is being executed (hereinafter, feedback information) on the display 14 from a start time of character recognition process by the character recognition processor 132 to a time when the result of the character recognition process is acquired. Here, the feedback information includes information on a position of character included in the image, for example. As described above, the feedback information is displayed on the display 14 before the character recognition process is finished.

The third display processor 134 displays the result of the character recognition process on the display 14 when the character recognition process by the character recognition processor 132 is finished.

The search processor 135 executes search process utilizing the result of the character recognition result displayed by the third display processor 134. Here, the result of the search process by the search processor 135 is displayed on the display 14.

The display 14 is realized by, for example, a touch panel display included in the character recognition apparatus 10.

Here, the touch panel display includes such as an electrostatic capacitive touch panel that is able to detect a contact position of a finger (or a pen) on a screen. The user is able to manipulate the character recognition apparatus 10 by contacting (touching) on the screen of the touch panel display with their finger.

Figure 2:
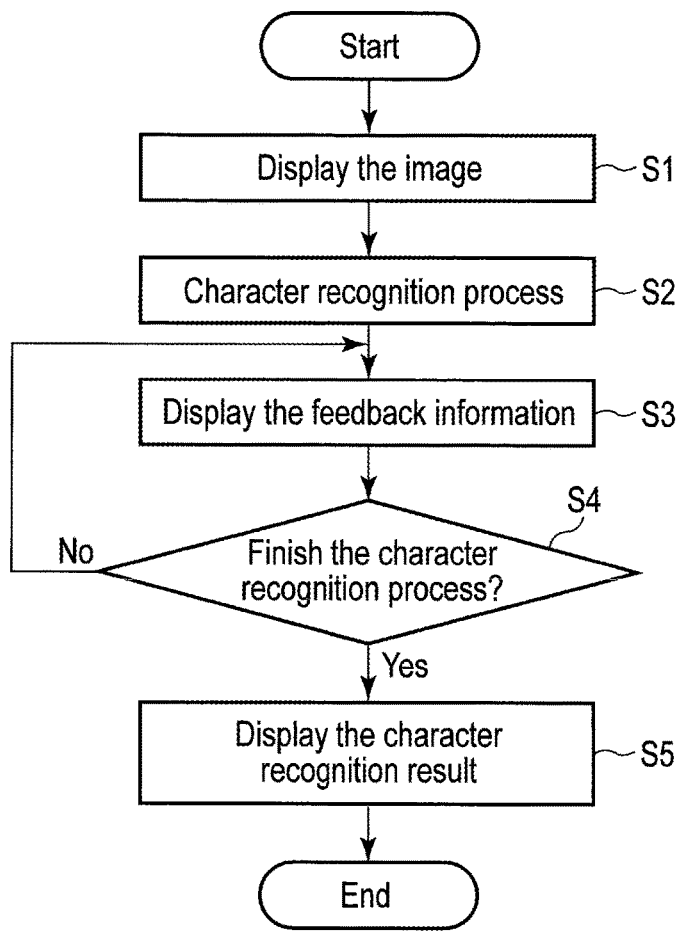
FIG. 2 illustrates a flowchart that shows one example of processing procedure by the character recognition apparatus according to an aspect of the present disclosure.

Next, referring to a flowchart of FIG. 2, one example of processing procedure by the character recognition apparatus 10 according to the present aspect is described.

Here, the process in FIG. 2 is executed by the processor 13, for example, when the character recognition application in the character recognition apparatus 10 is activated.

First, when the character recognition application is activated in the character recognition apparatus 10, the first display processor 131 acquires the image taken by the camera 11. When the character recognition apparatus 10 is such as smartphone, the character recognition apparatus 10 has a button (for example, shutter button) for the user to give instructions to the camera 11 for taking the image. In this case, the first display processor 131 acquires the static image taken by the camera 11 when the user pushes the shutter button. The first display processor 131 displays the acquired image on the display 14 (step S1). Here, the image acquired by the first display processor 131 may be stored in the storage 12. While here explains the case that the static image taken by the camera 11 is acquired and displayed on the display 14, the first display processor 131 may display a movie taken by the camera 11 on the display 14.

Next, the character recognition processor 132 executes the character recognition process in order to recognize characters (character strings) included in the image displayed by step S1 (step S2).

Here, in the character recognition process, the process for detecting an area that includes the character string from the image displayed by the step S1 (hereinafter, character string area) is executed. Next, the process for recognizing the character string included in the detected character string area is executed and text that represents the character sting is acquired as the result of the character recognition process (hereinafter, character recognition result).

The character recognition processor 132 may execute translation process for the acquired text. By this translation process, translation result that the text is translated into a predefined language (that is, translation sentence of the text) is acquired.

In other words, the character recognition result according to the present aspect may be text that represents character string included in the image (character string area) or may be translation sentence of the text.

In this aspect, the character recognition process is mainly explained as a process that includes the process for detecting character string area form the image and the process for recognizing character string included in the detected character string area (the process for acquiring the text that represents the character string). In addition, the character recognition process may also include the translation process for the text.

Here, the character recognition process needs a certain amount of time in order to acquire the character recognition result. Therefore, the second display processor 133 displays the feedback information that indicates the current character recognition process is being executed while the character recognition process by the character recognition processor 132 is executed (that is, until the character recognition result is acquired) (step S3). Here, the feedback information is information in order to feedback processing status of character recognition to the user who is using the character recognition apparatus 10.

In particular, the second display processor 133 displays a partial area of the image as the feedback information, for example. The partial area is an area that is estimated to include characters by the character recognition process (the process for detecting character string area). Some examples of the feedback information displayed on the display 14 are described later.

After the execution of step S3, step S4 judges whether the character recognition process by the character recognition processor 132 is finished or not (step S4).

When the character recognition process is judged to be finished (YES in step S4), the character recognition processor 132 acquires the character recognition result. The third display 134 displays the character recognition result acquired by the character recognition processor 132 on the display 14 (step S5). Here, if the character recognition process includes the translation process as described above, the character recognition process is judged to be finished when the translation process is finished (when the translation sentence is acquired).

On the other hand, if the character recognition process is judged to be not finished (NO in step S4), it goes back to step S3 and continues the process. In other words, in the process of FIG. 2 the display of the feedback information is kept until the character recognition process is finished. Here, the feedback information may be update according to, for example, the progress of the character recognition process (processing status) (that is, the different feedback information may be displayed based on the processing status).

Hereinafter, it concretely describes transition examples of screen displayed on the display 14 (hereinafter, display screen) when the character recognition process is executed by the character recognition apparatus 10.

As described above, when the character recognition application in the character recognition apparatus 10 is activated and the image is taken by the camera 11, the image (including the display screen) is displayed on the display 14.

Figure 3:
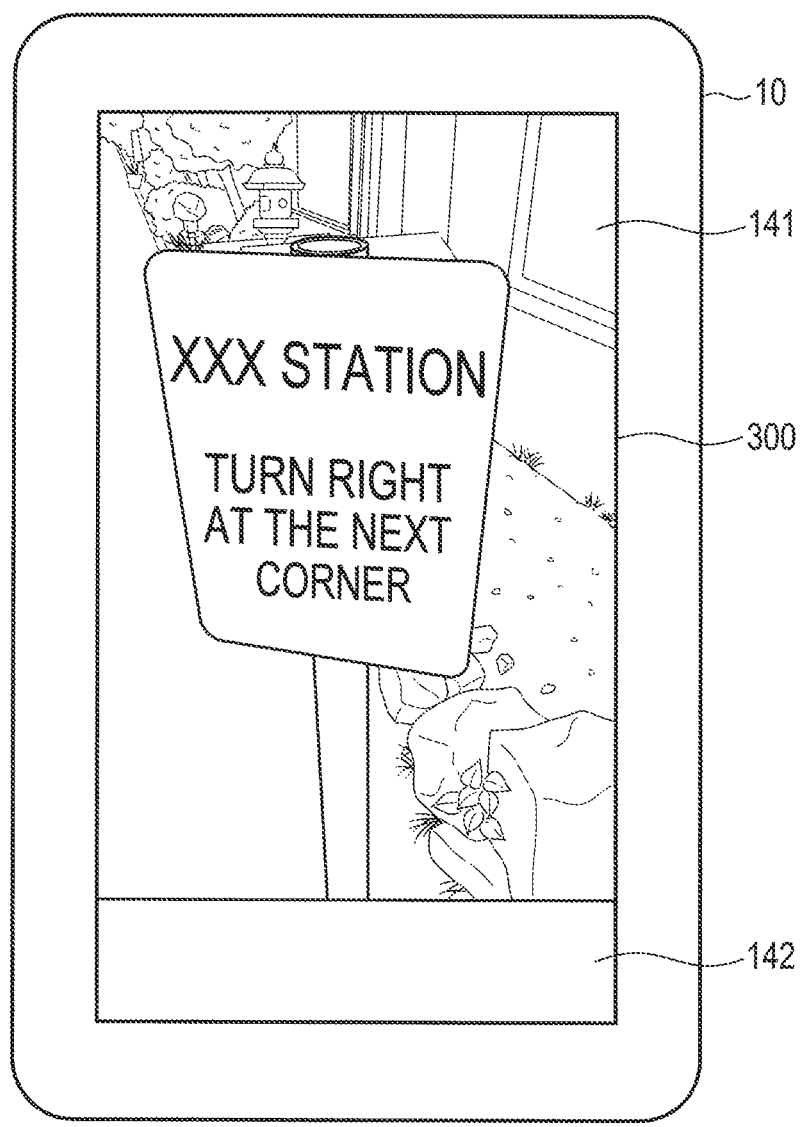
FIG. 3 shows one example of display screen in the case that the image taken by the camera is displayed according to an aspect of the present disclosure.

FIG. 3 shows one example of display screen in the case that the image taken by the camera 11 (hereinafter, taken image) is displayed.

As shown in FIG. 3, a first area 141 and a second area 142 are set to the display screen.

The first area 141 is an area to show the taken image (static image). In the example of FIG. 3, a taken image 300 that includes the signboard in which the character strings of "XXX STATION" and "TURN RIGHT AT THE NEXT CORNER" are written is displayed.

The second area 142 is an area to show, for example, the result of character recognition process to the taken image displayed on the first area 141. As shown in FIG. 3, before executing the character recognition process, the second area 142 is blank.

Next, the character recognition process for the taken image 300 in FIG. 3 is executed. In the character recognition process, as described above, the process for detecting character string area and the process for acquiring text that represents character string in the character string area are executed.

In the present aspect, while the character recognition process is executed, the feedback information that indicates the present character recognition process is being executed is displayed.

Hereinafter, it concretely explains the feedback information. In this aspect, the feedback information includes, for example, a likelihood map image (information on likelihood) that represents likelihood of character existence for each pixel that configures the taken image.

In this case, the second display processor 133 extracts a plurality of character candidate areas from the taken image (original image) and adds one to likelihood for each pixel included in the character candidate areas, for example. For example, the character candidate area is a part of the taken image and has a possibility to include characters. For example, extraction of the character candidate area is executed by extracting feature parts such as edges based on luminance value of each pixel of the taken image and specifying an area that has features of character likeness.

As described above, a plurality of character candidate areas are extracted. The likelihood for pixels that have high number of extracted times as character candidate area becomes high and the likelihood for pixels that have low number of extracted times as character candidate area becomes low. The second display processor 133 generates a likelihood map image by adding color according to the likelihood of each pixel to the each pixel. In this aspect, the feedback information includes color information. The above method of likelihood map generation is one example and the likelihood map may be generated by using other known technologies.

In this aspect, a likelihood map image generated by the second display processor 133 is displayed on the display 14, for example, after the execution of character recognition process starts and until a character string area is detected.

Figure 4:
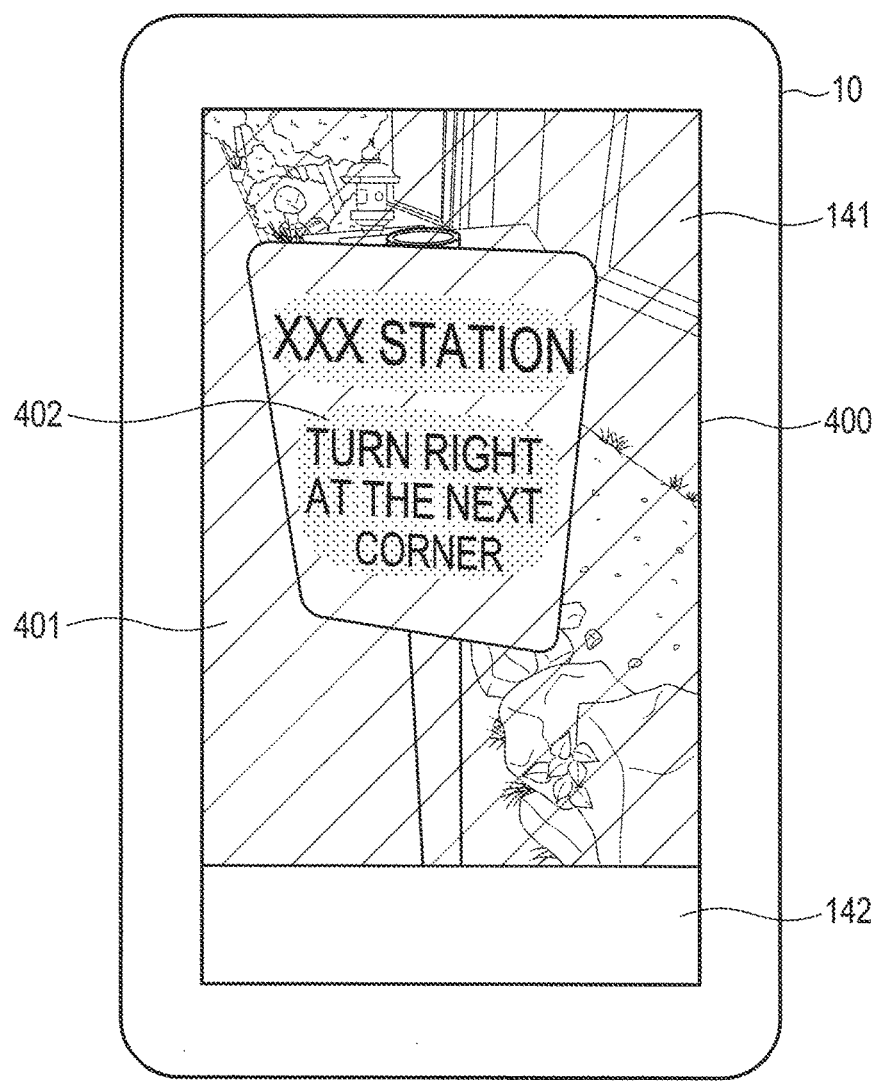
FIG. 4 illustrates one example of display image when a likelihood map image is displayed as feedback information according to an aspect of the present disclosure.

FIG. 4 illustrates one example of display image when a likelihood map image is displayed as feedback information.

As in FIG. 4, a likelihood map image 400 is displayed on the taken image 300 that is displayed on the first area 141. Here, an area 401 in the likelihood map image 400 in FIG. 4 illustrates an area that includes low likelihood pixels (in other words, an area that has low possibility of character existence). On the other hand, an area 402 in the likelihood map image 400 illustrates an area that includes high likelihood pixels (in other words, an area that has high possibility of character existence).

In particular, in the likelihood map image 400, the area 401 that has lower likelihood than a predefined value is displayed by black (or gray), for example. The area 402 that has higher likelihood than the predefined value is displayed by white.

While the area 402 is explained to be displayed by one color (white), the area 402 may be displayed by a plurality of colors according to likelihood of each pixel, for example.

In this way, the user of the character recognition apparatus 10 is able to understand that the character recognition apparatus 10 is executing character recognition process and that the area 402 is estimated to include characters by the character recognition apparatus 10 (in other words, a part of image where the character recognition image recognizes as area to include characters).

In FIG. 4, it explains the case that the likelihood map 400 is displayed on the taken image 300. For example, in one configuration, the taken image 300 may be hidden when the character recognition process starts and only the likelihood map image 400 may be displayed.

Figure 5:
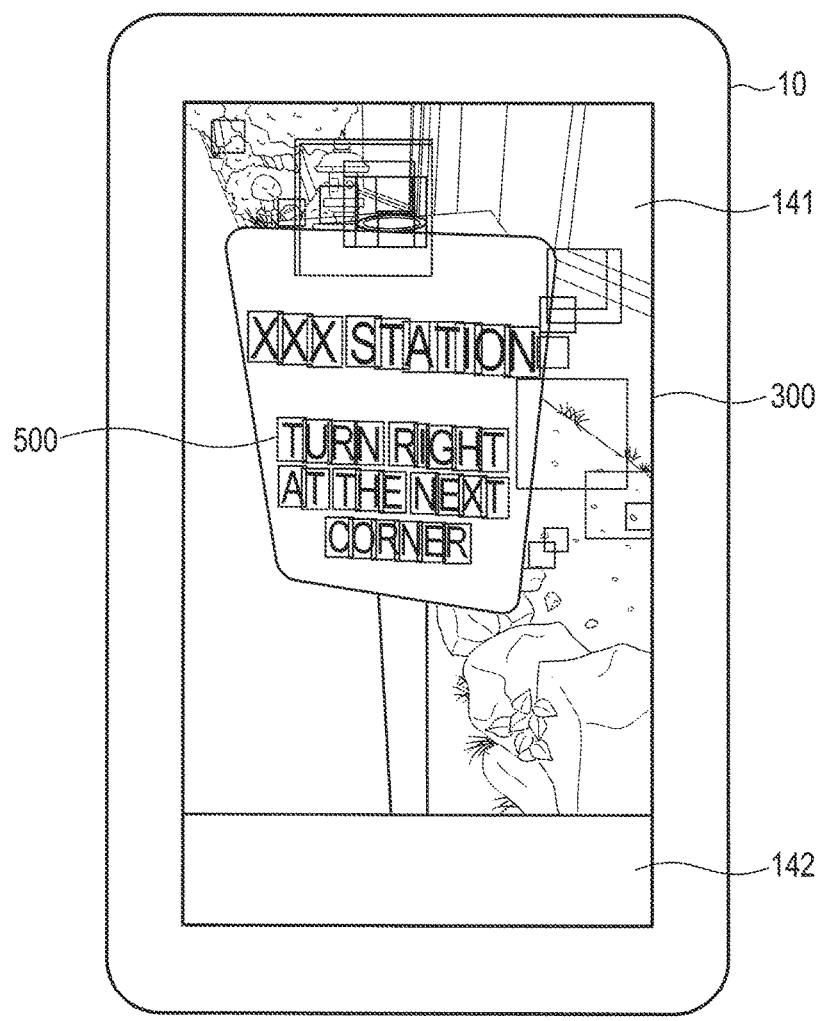
FIG. 5 illustrates one example of display screen in the case that frame borders that represent each of character candidate areas are displayed instead of likelihood map image according to an aspect of the present disclosure.

Moreover, instead of displaying the likelihood map image 400, frame borders 500 in FIG. 5 that represent each of the plurality of character candidate areas (frame borders that include areas on the taken image 300 where there is a possibility of character existence) may be displayed on the taken image 300 as feedback information. The frame borders 500 in FIG. 5 may be displayed on the likelihood map image 400. By displaying the frame borders 500, rough size of detected character can be notified to the user. While the frame borders 500 in FIG. 5 are rectangular shape, the frame borders 500 may be other shapes such as circle.

In other words, in this aspect, the feedback information (information on positions of recognition targets) includes information that indicates a part of image or information on frame borders that include a part of image.

It explains the case that the character string area is detected by the character recognition processor 132.

In this case, the second display processor 133 hides the likelihood map image 400 and displays frame borders that represent bounding rectangles of detected character areas (hereinafter, frame borders of character string areas) as feedback information.

Figure 6:
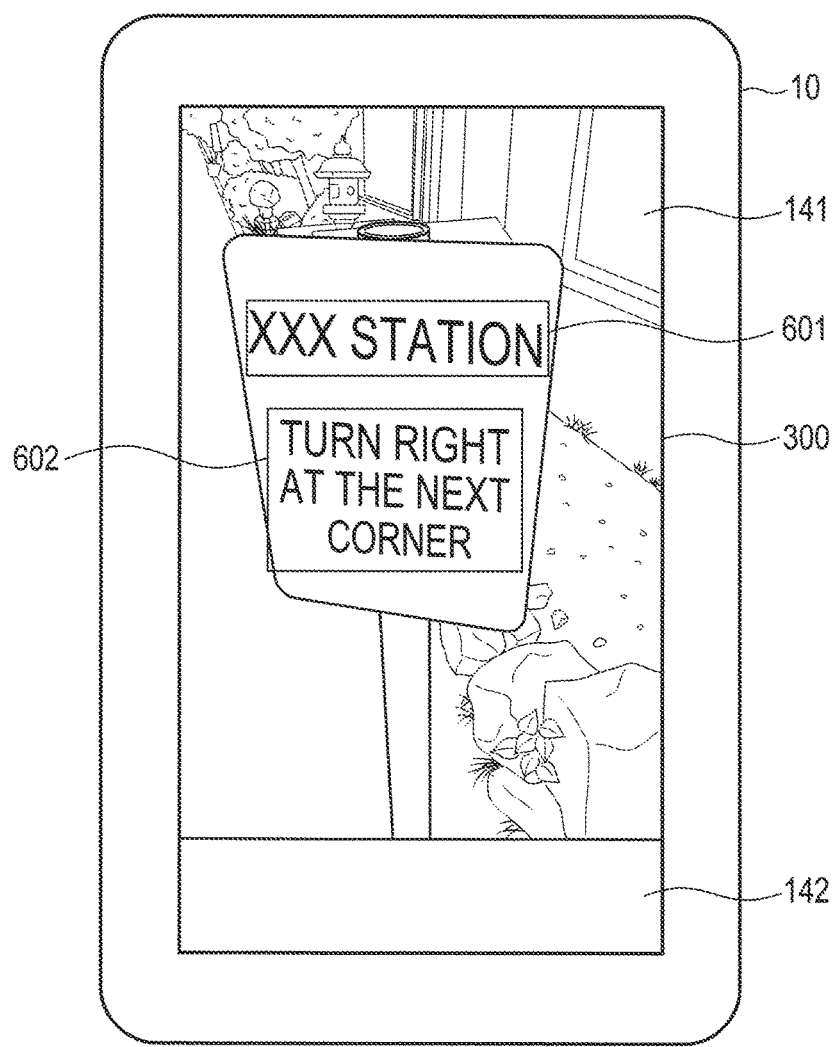
FIG. 6 illustrates one example of display screen in the case that a frame border of character string area is displayed as feedback information according to an aspect of the present disclosure.

FIG. 6 illustrates one example of display screen in the case that a frame border of character string area is displayed as feedback information.

As illustrated in FIG. 6, frame borders of character string areas are displayed on the taken image 300, for example. In FIG. 6, the frame border 601 of character string area that includes the character string of "XXX STATION" and the frame border 602 of character string area that includes the character string of "TURN RIGHT AT THE NEXT CORNER" written on the signboard in the taken image 300 are displayed.

The frame borders 601 and 602 in FIG. 6 are displayed on the display 14 (the first area 141) until the character recognition results are obtained by the character recognition process, for example.

In this way, the user of the character recognition apparatus 10 is able to understand that the character recognition apparatus 10 is executing character recognition process and that areas included by the frame borders 601 and 602 are detected as character string areas.

The display forms (shape, color and so on) of the frame borders 601 and 602 may be changed according to detection accuracy (likelihood) of character string areas included in each of the frame borders 601 and 602 in FIG. 6. For example, the detection accuracy of character string area may be a summation of likelihood of pixels included in the character string area among likelihood of pixels included in the taken image 300.

FIG. 6 shows the case that the frame borders 601 and 602 are displayed. Alternatively, the frame borders 601 and 602 may be displayed when detection process for all character string areas is finished. The frame borders 601 and 602 may be displayed sequentially every time when each character string area is detected.

Although the frame borders 601 and 602 in FIG. 6 are rectangular shape, the frame borders 601 and 602 may be other shapes such as circle.

Here, it assumes that the character recognition process is finished and the character recognition result (for example, texts that represent strings included in the character string area) is obtained by the character recognition processor 132.

In this case, the third display processor 132 hides the frame borders of character recognition areas and displays the character recognition result obtained by the character recognition processor 132.

Figure 7:
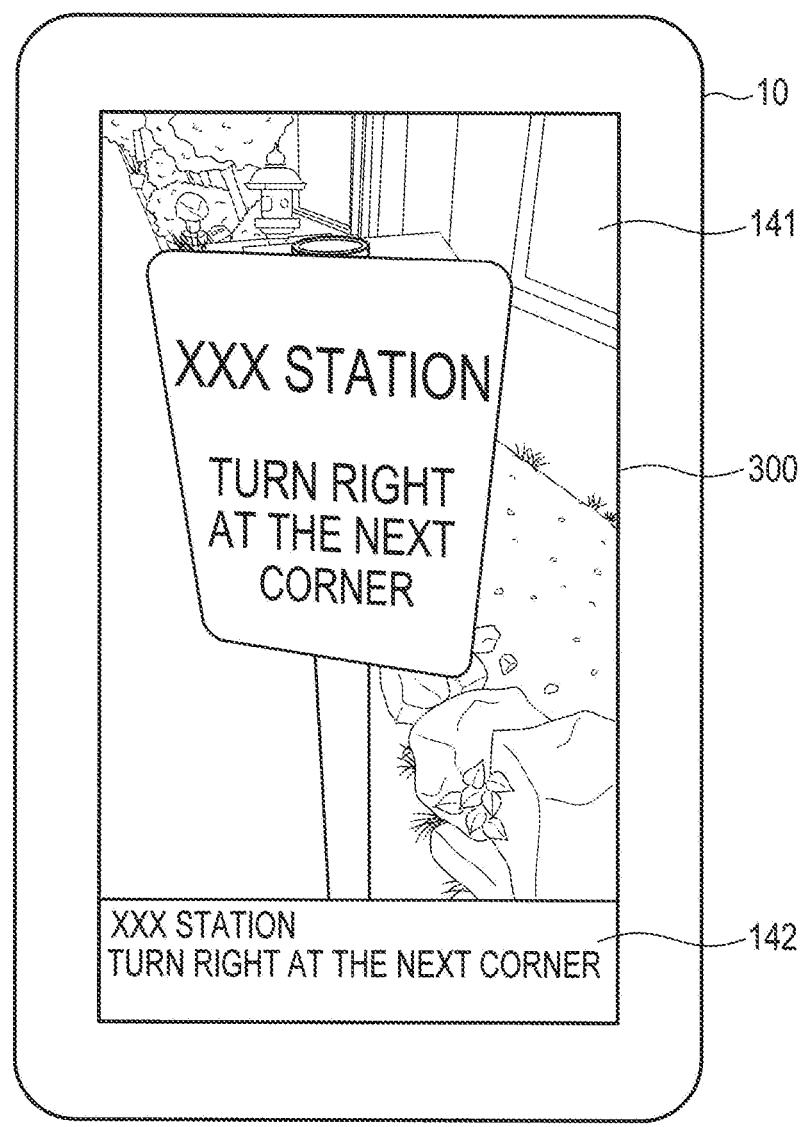
FIG. 7 illustrates one example of display screen when the character recognition result is displayed according to an aspect of the present disclosure.

FIG. 7 illustrates one example of display screen when the character recognition result is displayed. As illustrated in FIG. 7, the character recognition result is displayed on the second area 142 in the display screen.

In the example of FIG. 7, texts of "XXX STATION" and "TURN RIGHT AT THE NEXT CORNER" are displayed on the second area 142 as the character recognition result for the taken image 300.

Here, it explains the case that texts that represent the character strings included in the character string areas are obtained as the character recognition result. When translation result (translation sentence) of the texts is obtained as the character recognition result, the translation result may be displayed on the second area 142. Both texts and translation result of the texts may be displayed on the second area 142.

In this aspect, the display screen includes the first area 141 and the second area 142. Alternatively, the first area 141 may be set on the whole of the display screen until the character recognition result is obtained and the second area 142 may be set on the display screen when the character recognition result is obtained (when the character recognition result is displayed).

Here, a process to obtain texts representing character strings included in character string areas is executed sequentially for each character string area. In particular, for example, the text representing the character string included in the character string area of the frame border 602 is obtained after the text representing the character string included in the character string area of the frame border 601 is obtained.

Figure 8:
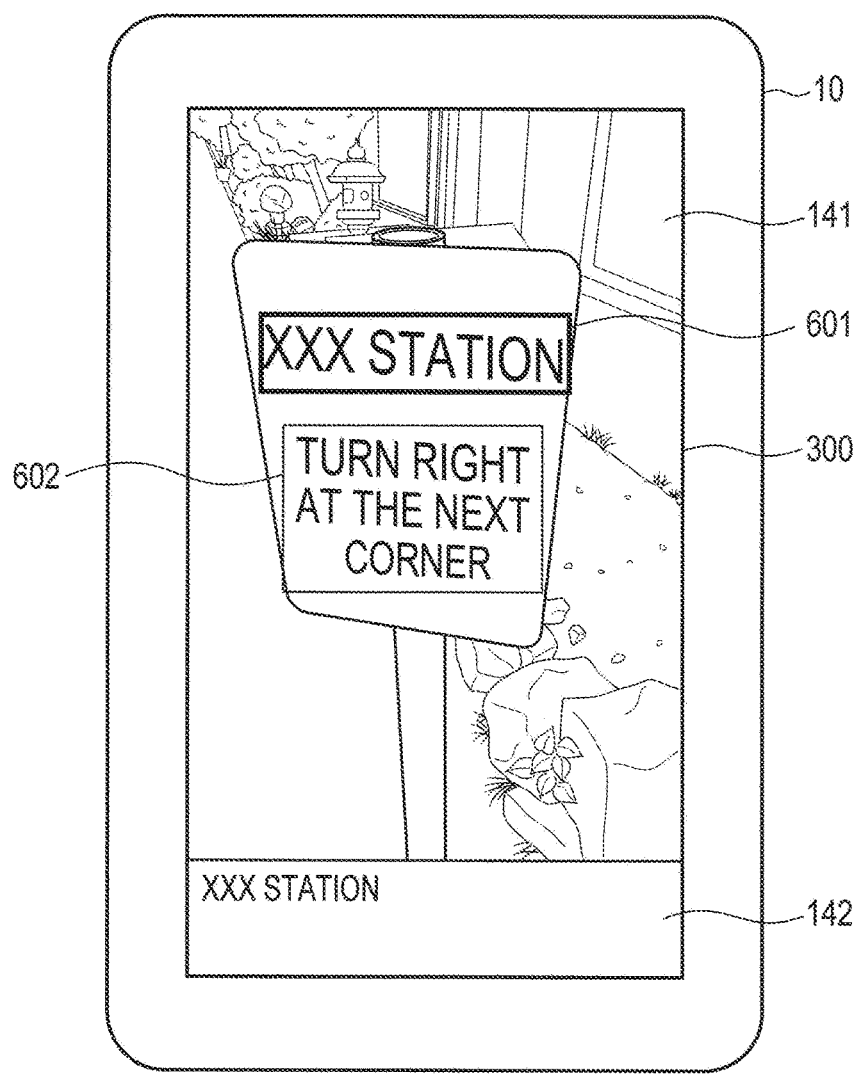
FIG. 8 illustrates one example of display screen when the frame border is highlighted according to text acquisition according to an aspect of the present disclosure.
Figure 9:
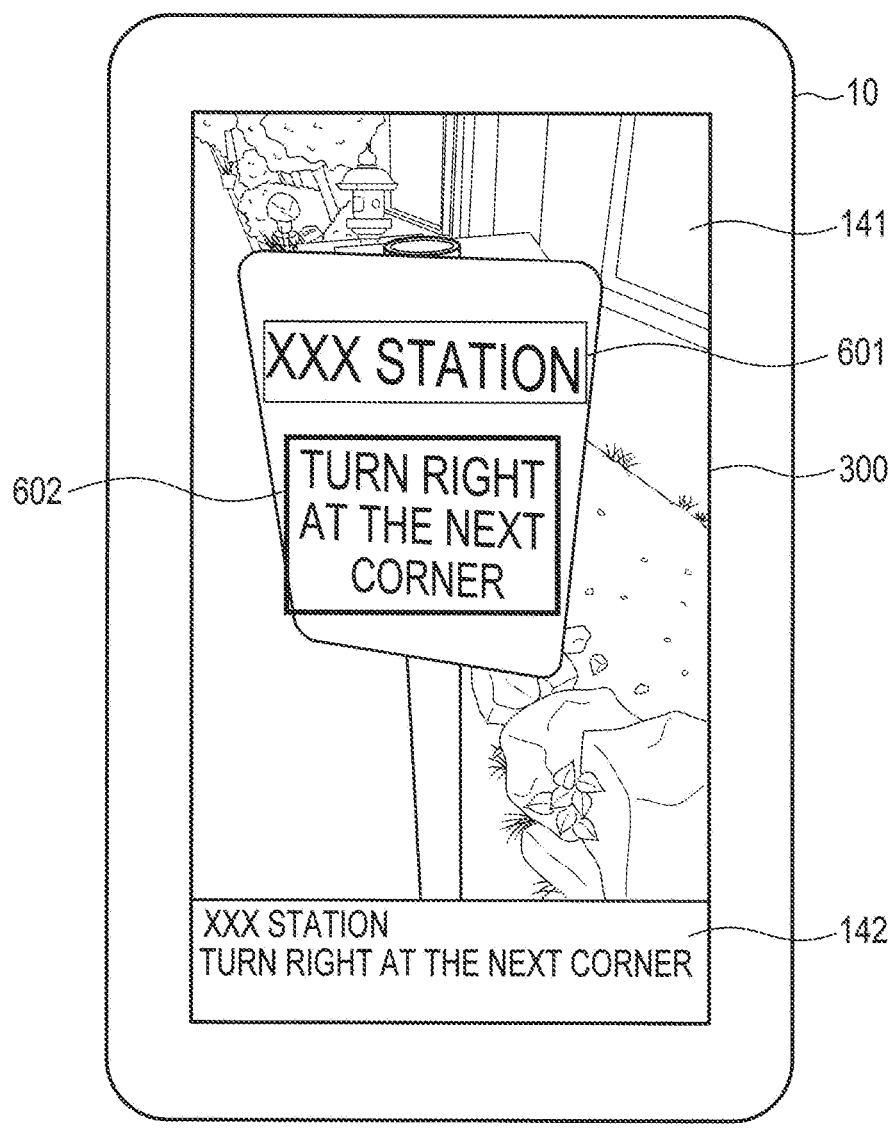
FIG. 9 illustrates one example of display screen when the frame border is highlighted according to text acquisition according to an aspect of the present disclosure.

In the example of FIG. 7, the frame border 601 and 602 of character string areas are hidden when the character recognition result is obtained. Alternatively, the display of the frame border 601 and 602 of character string areas may be kept even when the character recognition result is obtained. In this case, the frame border 601 may be highlighted when the text representing the character string included in the character string area of the frame border 601 is obtained and the frame border 602 may be highlighted when the text representing the character string included in the character string area of the frame border 602 is obtained. In particular, as illustrated in FIG. 8, the frame border 601 is highlighted when the text representing the character string of "XXX STATION" included in the character string area of the frame border 601 is obtained. After that, as illustrated in FIG. 9, the frame border 602 is highlighted when the text representing the character string of "TURN RIGHT AT THE NEXT CORNER" included in the character string area of the frame border 602 is obtained.

The frame border may be highlighted when the character string (or text) of the frame border displayed on the second area 142 is specified (or selected) by user. In particular, the frame border 601 is highlighted when the character string of "XXX STATION" displayed on the second area 142 is specified. The frame border 602 is highlighted when the character string of "TURN RIGHT AT THE NEXT CORNER" displayed on the second area 142 is specified.

Alternatively, only the frame border 601 may be displayed (the frame border 602 is hidden) when the character string of "XXX STATION" displayed on the second area 142 is specified. Only the frame border 602 may be displayed (the frame border 601 is hidden) when the character string of "TURN RIGHT AT THE NEXT CORNER" displayed on the second area 142 is specified.

With the configuration described above, the user is able to understand the character string area corresponding to the character recognition result (that is, the character string area that includes the character string of the text).

Figure 10:
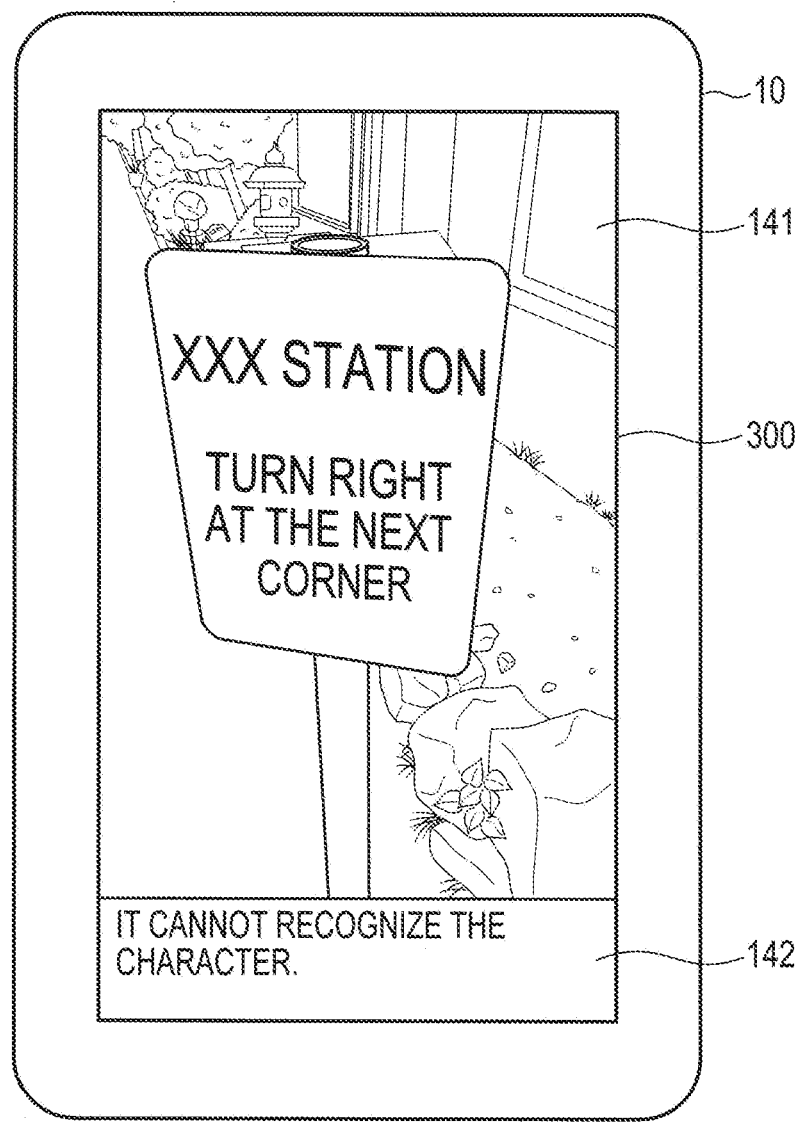
FIG. 10 illustrates one example of display screen when the result that shows character cannot be recognized is displayed according to an aspect of the present disclosure.

When the character string area is detected and the character string included in the character string area is not a recognizable language (for example, the character string is not an order of words of recognizable language), as illustrated in FIG. 10, the result that shows the character (string) is not be able to be recognized is displayed on the second area 142.

Figure 11:
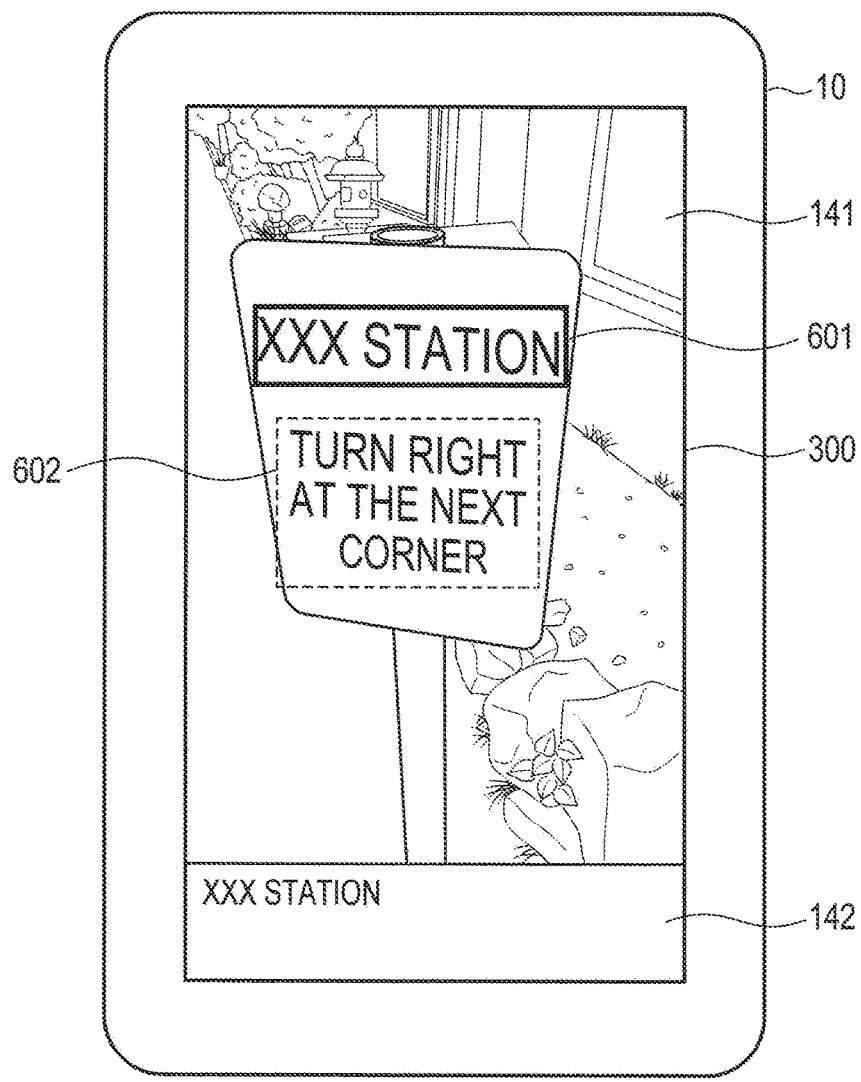
FIG. 11 illustrates one example of display screen when the frame border that includes the area of unrecognizable character string is displayed by broken line according to an aspect of the present disclosure.

Alternatively, when the frame border that includes the character string area is to be displayed, the frame border that includes unrecognizable character string may be displayed by other ways such as broken line. For example, as illustrated in FIG. 11, the frame border 602 may be displayed by broken line when the character string included in the character string area of the frame border 601 is recognizable and the character string included in the character string area of the frame border 602 is unrecognizable. Alternatively, the frame border 602 may be displayed by other colors (that show the character is unrecognizable) or may be hidden.

The process illustrated in FIG. 2 is executed every time when an image is taken by the camera 11 when the user pushes the shutter button.

In this case, when a first image is taken by the camera 11, the character recognition result of the first image is displayed on the second area 142. After that, when a second image is taken by the camera 11, the character recognition result of the second image is displayed on the second area 142. Here, when the user needs to confirm the character recognition result for the first image after the second image is taken, it needs to retake the first image by the camera 11 and execute the character recognition process (alternatively, it needs to read the first image from the storage 12 and execute the character recognition process). However, it is inconvenient for the user.

In order to solve this problem, in this aspect, the history of the character recognition results is displayed on the second area 142. In particular, when the second image is taken after taking the first image, the character recognition results for both the first image and the second image are displayed on the second are 142. When the character recognition process for other images is executed, the character recognition results for the other images are added to the second area 142. In this case, the first image (or a thumbnail image of the first image) is displayed on the second area 142 in correspondence with the character recognition result for the first image. And, the second image (or a thumbnail image of the second image) is displayed on the second area 142 in correspondence with the character recognition result for the second image.

The first image and the second image may be still image. The first and the second images may be an image constituting a movie displayed on the display 14 (the first area 141) in real-time.

When the character recognition process for images constituting the movie displayed in real-time on the display 14 is executed, the same character recognition results are obtained many times. In this case, it is not helpful for the user to display the same character recognition results in the history of the character recognition results. Therefore, in this aspect, when the same character recognition result as the past-obtained character recognition result (text) is obtained, these character recognition results are collected and displayed as one character recognition result on the second area 142.

Instead of simply collecting the same character recognition results, only the character recognition results from the same character string area may be collected and displayed as one character recognition result based on information on imaging targets (objects) by matching between images or measuring locations of the character recognition apparatus 10 (the camera 11) and so on. In particular, by taking correlations among a plurality of images of which size are normalized and judging similarities among the plurality of images, the character recognition results obtained from the similar images can be collected and displayed as one character recognition result.

In the same manner, it is possible to collect the character recognition results corresponding to the same character string area by judging identity of imaging targets based on the locations of the character recognition apparatus 10, the angles of the camera 11 and so on.

In this aspect, when the imaging targets (a first recognition target and a second recognition target) included in each of the plurality of images are the same, one of display processes for the character recognition results of the plurality of images may be executed (for example, display process for the character recognition result of the first recognition target may be executed).

When judging the identity of imaging targets, the judging process may be executed before executing the character recognition process. In this configuration, it is possible to skip the character recognition process for the same imaging target and reduce process amount of the character recognition apparatus 10.

For example, the locations of the character recognition apparatus 10 can be obtained from GPS function embedded in the character recognition apparatus 10 (for example, smartphone). The angles of the camera 11 can be judged by accelerator sensor embedded in the character recognition apparatus 10.

When a plurality of character recognition results are displayed on the second area 142 and there is no space to display a new character recognition result, the past character recognition result may be deleted from the second area in the order of acquisition.

Although both the character recognition result for the image (taken image) displayed on the first area 141 and the history of character recognition results are displayed on the second area 142, an area for displaying the character recognition result for the image displayed on the first area 141 and an area for displaying the history of character recognition results may be separated.

When the movie is displayed on the screen 14 in real-time, only the character recognition result for the movie (image displayed in real-time) may be displayed instead of displaying the history of character recognition results (the past character recognition results). It is possible to switch between displayed and hidden of the history of character recognition results based on the kind of recognition target image (still image or movie).

In this aspect, the character recognition result obtained by the character recognition process is displayed on the second area 142. The character recognition result displayed on the second area 142 may be utilized for search process.

Hereinafter, referring to the flowchart of FIG. 12, one example process of character recognition apparatus 10 in the case that the character recognition result is utilized for search process is described.

Here, it assumes that the character recognition result is displayed on the second area 142 by executing the process illustrated in FIG. 2. In this case, the user of the character recognition apparatus 10 is able to operate the character recognition apparatus 10 for specifying the character recognition result displayed on the second are 142 (hereinafter, specifying operation). In the case that the character recognition apparatus 10 has the configuration of touch panel display, the specifying operation includes operation to touch the character recognition result displayed on the second area 142 by finger, for example.

When the specifying operation is executed by user, the search processor 135 included in the processor 13 obtains the character recognition result specified by the specifying operation (step S11). The character recognition result obtained by step S11 includes text representing character string included in the taken image.

Next, the search processor 135 executes search process based on the character recognition result obtained by step S11 (step S12). In this search process, for example, web pages (site) are searched via internet by using the character recognition result (text) as search word.

The result of the search process (search result) in step S12 is displayed on the screen 14 (step S13). In this case, for example, the search result is displayed on the second area 142.

Here, it concretely explains the process illustrated in FIG. 12. It assumes that the texts of "XXX STATION" and "TURN RIGHT AT THE NEXT CORNER" are displayed on the second area 142 as the character recognition result for the taken image 300.

In this case, for example, the user is able to execute the specifying operation to specify at least one word of the plurality of words constituting the texts displayed on the second area 142. For example, the user is able to touch (specify) the words "XXX STATION" as search keyword.

With this operation, the search processor 135 searches web pages by using the "XXX STATION" as search keyword. In this case, for example, the search results including time table (web page) of "XXX station" are displayed on the second area 142 in the form of thumbnail. As for the search results, some web pages that have higher scores (matching degrees) of consistence with the search keyword are displayed.

The user is able to display the time table (web page) of "XXX STATION" on the screen 14 (the first area 141 or the whole screen) by specifying the search result (thumbnail) in the second area 142.

Here, in this aspect, the character recognition result may be translation sentence of text representing the character string included in the taken image. When the translation sentence is utilized to search web pages, the search process may be executed based on the translation sentence or the text before translation.

It explains the case that web pages are searched. Alternatively, for example, it may be the configuration to search applications (programs) installed in the character recognition apparatus 10. For example, when "XXX STATION" is specified as search keyword, the application used for train transit guidance may be searched and started automatically. Alternatively, the application to show a map (map information) may be searched and the map around the "XXX STATION" may be displayed automatically.

Instead of the application, for example, it may be the configuration to search various kinds of contents stored in the storage 12. When images taken by the camera 11 are stored in the storage 12, the image from which specified character recognition result is obtained may be searched from the storage 12 and displayed on the screen 14 (for example, in the first area 141). In this case, the image and the character recognition result of the image may be linked in the character recognition apparatus 10 (the storage 12).

By storing location information that shows the location where the image is taken in the storage 12 and correlating the location information with the image, the image of the character recognition result and the location where the image is taken can be displayed when the character recognition result is specified. With this configuration, in the case that a plurality of images that include names of restaurants are taken, the image of the signboard that shows the name of restaurant and the location of the signboard (the location where the image is taken) can be known.

Instead of searching images from the storage 12, various contents stored in the outside server may be searched.

When the search result is displayed on the second area 142, there might not be enough space to show the search result in the second area 142 illustrated in FIG. 7. Therefore, when the search process is executed (that is, when the search result is displayed on the second area 142), the area of the second area 142 may be widened. In this case, although the first area 142 becomes small, the display area of the taken image 300 in the first area 141 may be adjusted to include at least the character string area (string included in the character string area).

In this aspect, the character recognition process that includes the process for detecting character string area from the image (a first process) and the process for recognizing characters included in the detected area (a second process) are executed, and the feedback information that shows the character recognition process is being executed is displayed while the character recognition process is executed, and the character recognition result is displayed when the character recognition process is finished. In this aspect, an area of image that is estimated to include characters in the process of detecting character string area is displayed as the feedback information.

In particular, the likelihood map image that has color according to the likelihood (degree to include characters) of each pixel or the frame borders that include the areas that have possibility to include the characters are displayed as the feedback information.

This aspect is able to show the processing status of character recognition to the user and the user is able to understand that the character recognition process for the image is ongoing and the user does not feel that waiting time is long. In other words, this aspect is able to achieve the display for character recognition in order to enhance the utility for user.

In this aspect, it is possible to show the area (or its location) that the character recognition apparatus 10 recognizes as character location to user and the user is able to know whether the character recognition process is being executed appropriately (that is, whether the character intended by the user is recognized). In particular, for example, when the likelihood map image 400 in FIG. 4 is displayed, the user is able to know that character locations in the taken image 300 are recognized appropriately. On the other hand, when the likelihood map image is displayed on the whole area of the area 401, the user is able to know that character locations are not recognized appropriately. In this case, the user is able to retake the image or execute the character recognition process again.

Figure 13:
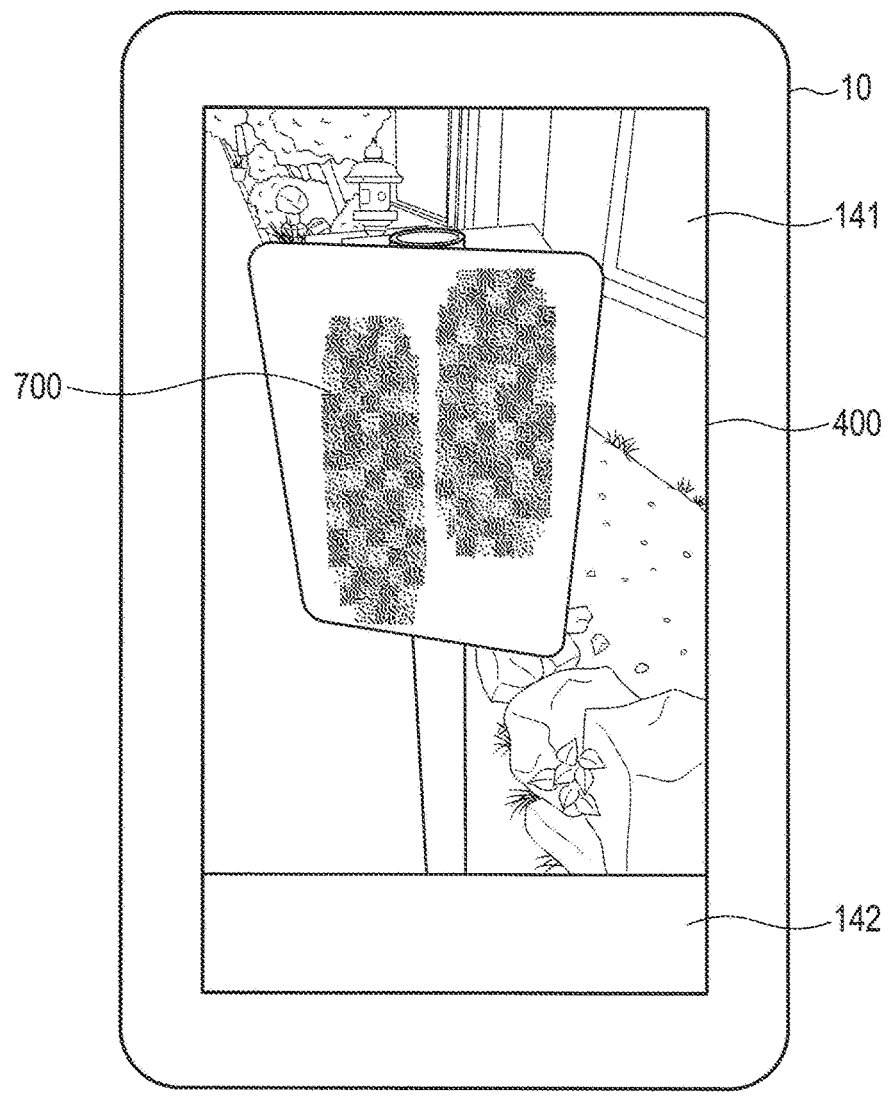
FIG. 13 illustrates one example of display screen the recognition target area is displayed by mosaic pattern according to an aspect of the present disclosure.
Figure 14:
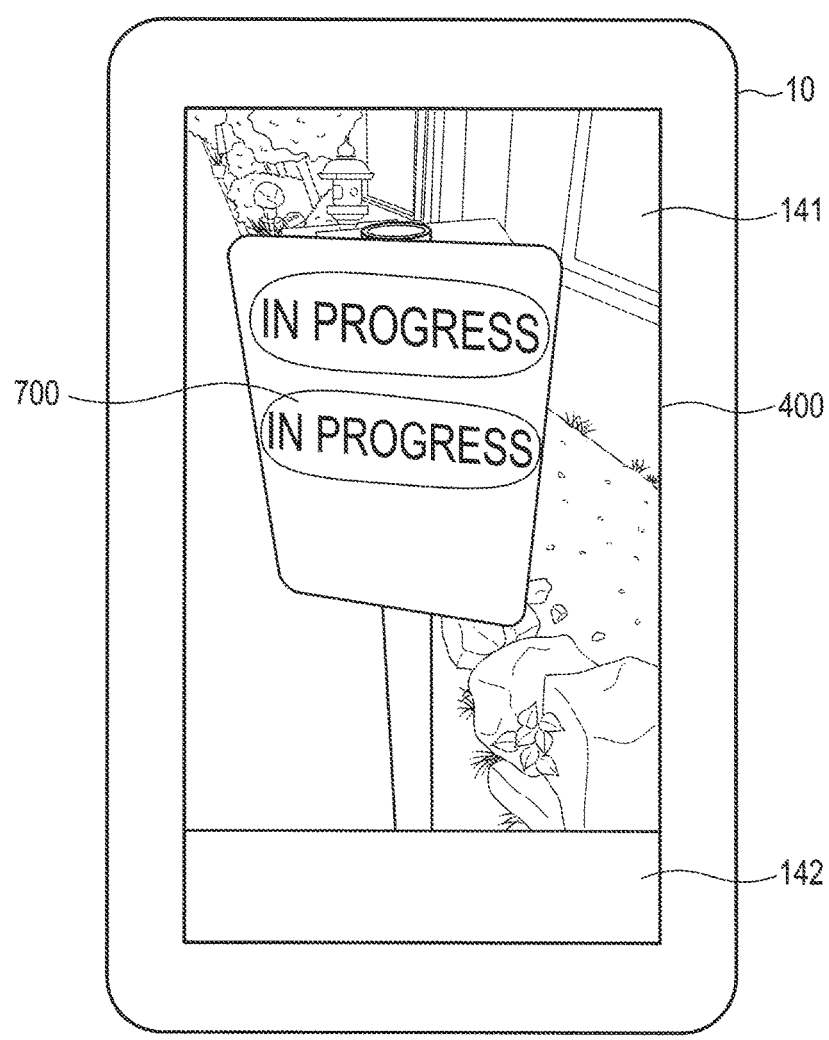
FIG. 14 illustrates one example of display screen when the specific character string is displayed on the recognition target area according to an aspect of the present disclosure.

In this aspect, one example of feedback information is explained. The feedback information is information in order to show that the character recognition process is being executed and the feedback information may be a different configuration in the course of the character recognition process. In particular, as illustrated in FIG. 13, the recognition target area 700 (the area that has high possibility to include characters) may be displayed by mosaic pattern. Alternatively, as illustrated in FIG. 14, the specific character strings (information on character strings that show the character recognition process is in progressing) such as "IN PROGRESSING" may be displayed on the area 700. Alternatively, the change of images may be utilized in order to show that the character recognition process is being executed (not shown in figure).

In this aspect, the image is displayed on the first area 141 of the character recognition apparatus 10 (the display 14) and the character recognition result (the result of character recognition process) is displayed on the second area 142 of the character recognition apparatus 10 (the display 14). By taking this configuration of this aspect, user's visibility for the character recognition result is improved.

While the second area 142 is positioned below the first area 141 in this aspect, the second area 142 may be placed above the first area 141 or the second area 142 may be placed left side or right side of the first area 141. Alternatively, the position of the second area 142 may be changed based on the character (character string area) included in the image displayed on the first area 141. In particular, the second area 142 may be placed near the character string area.

While the area to show the image (the first area 141) and the area to show the character recognition result (the second area 142) are separately placed, the image is displayed on the whole screen and the character recognition result may be displayed on the character (string) included in the image.

Moreover, in this aspect, the character recognition processes for the plurality of images (the first image and the second image) are executed and the plurality of character recognition results (the results of the first character recognition process and the second character recognition process) may be displayed as history. By taking the configuration of this aspect, when the character recognition result for the past image taken by the camera 11 is needed, the user is able to confirm the character recognition result without retaking the image.

In this aspect, when the plurality of character recognition results displayed as history are the same, the plurality of character recognition results are collected and displayed (that is, any one of the plurality of character recognition results is displayed). By taking this configuration, the area to show the history (the second area 142) is utilized efficiently.

In this aspect, when the character recognition result displayed on the second area 142 is specified by user, the image from which the character recognition result is obtained is displayed. By taking this configuration, the user is easily able to confirm the image from which the character recognition result is obtained even when the image was taken in the past by specifying the character recognition result.

In this aspect, when the character recognition result displayed on the second area 142 is specified by user, search process for the character recognition result (text) is executed and the search result is displayed. By taking the configuration of this aspect, the user is easily able to search information on the character recognition result and the usability for the user is improved.

The character recognition apparatus 10 described in this aspect may be a configuration that includes at least one of display examples described in this aspect or may be a configuration that includes a combination of the display examples.

In this aspect, for example, the camera 11 takes images that include signboards in the city. The objects taken by the camera 11 may be anything that includes characters. The objects may be menu, guidance board, merchandise tag, book, and so on. The objects may be display that shows characters.

While the character recognition apparatus 10 according to this aspect is a portable device such as smartphone or tablet computer as one example, the character recognition apparatus 10 may be implemented by a server that connects to an electronic device that includes the camera 11.

While the character recognition apparatus is described to recognize characters from the image in this aspect, the aspect may be applied to the case where objects other than characters are recognized from the image. In particular, the aspect may be applied to the information processing apparatus (recognition apparatus) that recognizes face, body, sign (mark), mobile object, and so on. When recognizing the objects, any know technology that utilizes statistical training can be utilized.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing device comprising:
a memory; and
a processor configured to:
  acquire an image;
  determine a likelihood of presence of an object within the image;
  display information on a position of the object within the image based on the likelihood;
  identify the object within the image; and
  generate a recognition result based on the identified object,
wherein the processor is further configured to:
  identify a first object within a first image and a second object within a second image;
  generate a first recognition result based on the identified first object;
  generate a second recognition result based on the identified second object;
  perform a display process for the first image when the first recognition result of the first object is selected; and
  perform a display process for the second image when the second recognition result of the second object is selected.

2. The device of claim 1, wherein the position of the object is displayed before the object is identified.

3. The device of claim 1, wherein the processor is further configured to:
display the recognition result after the object is identified.

4. The device of claim 1, wherein the information on the position of the object in the image includes a visual indicator of the position within at least one part of the image.

5. The device of claim 1, wherein the information on the position of the object in the image includes a frame border that encompasses at least one part of the image.

6. The device of claim 1, wherein the information on the position of the object in the image includes color information based on the likelihood of presence of the object.

7. The device of claim 1, wherein the information on the position of the object in the image includes character string information that indicates the identification of the object is in progress.

8. The device of claim 1, wherein the information on the position of the object in the image includes information on the likelihood of presence of the object.

9. The device of claim 1, further comprising:
a display that displays the image.

10. An information processing device comprising:
a memory; and
a processor configured to:
  acquire an image;
  determine a likelihood of presence of an object within the image;
  display information on a position of the object within the image based on the likelihood;
  identify the object within the image; and
  generate a recognition result based on the identified object,
wherein the processor is further configured to:
  identify a first object included in a first image and a second object included in a second image;
  generate a recognition result based on the identified first object and the identified second object; and
  perform a display process of the recognition result of the first object when the first object and the second object are a same object.

11. An information processing method comprising:
acquiring an image;
determining a likelihood of presence of an object within the image;
displaying information on a position of the object within the image based on the likelihood of presence of the object;
identifying the object within the image; and
generating a recognition result based on the identified object, wherein
  identifying the object comprises identifying a first object within a first image and a second object within a second image,
  generating the recognition result comprises generating a first recognition result based on the identified first object and generating a second recognition result based on the identified second object,
  a display process for the first image is performed when the first recognition result of the first object is selected, and
  a display process for the second image is performed when the second recognition result of the second object is selected.

12. The method of claim 11, wherein the position of the object is displayed before the object is identified.

13. The method of claim 11, comprising:
displaying the recognition result after the object is identified.

14. The method of claim 11, wherein the information on the position of the object in the image includes a visual indicator of the position within at least one part of the image.

15. The method of claim 11, wherein the information on the position of the object in the image includes a frame border that encompasses at least one part of the image.

16. The method of claim 11, wherein the information on the position of the object in the image includes color information based on the likelihood of presence of the object.

17. The method of claim 11, wherein the information on the position of the object in the image includes character string information that indicates the identification of the object is in progress.

18. The method of claim 11, wherein the information on the position of the object in the image includes information on the likelihood of presence of the object.

* * * * *